United States Patent Office 2,698,348
Patented Dec. 28, 1954

2,698,348

HALOGENATION

Albert P. Giraitis, Baton Rouge, La., assignor to Ethyl Corporation, New York, N. Y., a corporation of Delaware No Drawing. Application April 2, 1952,
Serial No. 280,189

4 Claims. (Cl. 260—659)

This invention relates to the preparation of organic halogen compounds and more particularly to a new and novel process wherein organic compounds containing dissimilar halogen atoms are produced directly from the parent organic compound and a mixture of inorganic halogen salts.

This application is a continuation-in-part of my prior copending application, S. N. 208,527, filed January 30, 1951.

Organic compounds containing two or more dissimilar halogen atoms would be very useful in synthetic organic chemistry and in industrial application. Examples of such industrial applications would include their use as solvents, particularly for dry cleaning and degreasing operations, as fumigants, as "scavengers" in leaded fuels, as refrigerants, propellants, as fire extinguishing material and as flotation agents in mineralogy.

These compounds have in the past been prepared by several synthetic methods. Among these are addition of hydrogen halide to doubly bonded halogenated compounds; metathesis between an organic polyhalide and an inorganic halide containing a dissimilar halogen; addition of a mixed halogen compound such as iodine monochloride or iodine monobromide to a double bond, direct substitution halogenation of an organic halogen compound with elemental halogen and the like. In every case these methods suffer the disadvantage that either hydrogen halide or free halogen must be isolated and handled prior to the halogenation reaction. Even in the case of metathesis of an inorganic polyhalide with a dissimilar inorganic halide, preparation of the inorganic halide involves the use of elemental halogen or hydrogen halide.

An object of this invention is to provide a new method for the preparation of organic compounds containing dissimilar halogen atoms. A further object is to provide a method for preparation of organic compounds containing dissimilar halogens, which process eliminates the necessity of prior isolation of elemental halogen or hydrogen halide.

The present invention broadly comprises reacting an organic compound with a mixture of inorganic compounds of two or more dissimilar halogens in the presence of sulfur trioxide. In practicing my invention I obtain products derived from the organic reactant and containing two or more dissimilar halogen atoms in the molecule. The invention is applicable to organic compounds broadly. Typical of the compounds suitable for use in my process are hydrocarbons, halogenated hydrocarbons, halides, ketones, acids, both carboxylic and sulfonic, anhydrides, esters, nitriles, amides, ethers, and the like. Preferred organic reactants are the alkanes, particularly those containing not more than four carbon atoms. Best results are obtained with alkanes of two or less carbon atoms, namely ethane and methane.

In the practice of my invention an organic compound together with sulfur trioxide is passed through a reaction zone containing a plurality of dissimilar inorganic halides, the reaction zone being held at an elevated temperature. The organic compound is converted smoothly and at a fast rate to products containing dissimilar halogen atoms. In other words, two or more dissimilar halogen atoms are introduced simultaneously to the organic molecule. The reaction rate is so fast that it is usually measured in a matter of seconds or a few minutes. Practice of my invention ordinarily results in a mixture of desired products. Thus, if methane, for example, is treated under my reaction conditions with a mixture of inorganic bromide and chloride, the organic products include chlorobromomethane, chlorodibromomethane, chlorotribromomethane, dichlorodibromomethane, dichlorobromomethane and trichlorobromomethane. Minor amounts of products containing only one halogen derivative such as methyl chloride, methylene chloride, methyl bromide, and the like, may also be present. These can be separated from the desired products by customary means such as fractional distillation.

It is possible to exercise considerable control of the process in order to produce predominantly a particular product. In general, the primary factors which control the predominant ratio of substitution of dissimilar halogens in the organic molecule are the molar ratio of dissimilar inorganic halogen compounds present in the reaction mixture, the relative rate of reactivity of the dissimilar inorganic halides, and the degree of contact of sulfur trioxides and the inorganic halide mixture. Of these, the ratio of dissimilar inorganic halide present in the reaction mixture appears to be the most important. In the example above, if the reaction is carried out with equimolar amounts of inorganic bromide and chloride, for example, the predominant organic products are substituted with the two dissimilar halogens in substantially equal proportions; that is, the principal product is either chlorobromomethane or dichlorodibromomethane, or a mixture of the two. If the molar ratio of inorganic bromide to chloride is of the order of two to one, then the predominant product will be substituted in substantially this ratio, as dibromochloromethane. If the ratio of inorganic bromide to chloride is approximately one to two, then the predominant organic product will be dichlorobromomethane. If the inorganic bromide to chloride ratio is approximately three to one, the predominant product will be chlorotribromomethane, and if the inorganic bromide to chloride ratio is approximately one to three, the predominant product will be trichlorobromomethane.

When more than one product containing dissimilar halogens in the same ratio is possible, the process can be controlled to yield chiefly one or the other, as desired. With methane, sulfur trioxide and an inorganic bromide to chloride ratio of approximately one to one in moles, for example, the predominant product will be either chlorobromomethane or dichlorodibromomethane, as stated above. When the reaction is controlled so that a relatively short contact time is used, then chlorobromomethane will predominate. With somewhat longer residence time the major product will be dichlorodibromomethane. The considerations developed in this and the preceding paragraph apply also to other organic compounds and to other inorganic halogen mixtures including mixtures of more than two dissimilar halogens.

The exact mechanism by which my invention operates is not clearly known to me. It is probable, however, that the overall transformation of organic material to polyhaloorganic product occurs according to schemes similar to the overall reaction equations indicated below.

I. $6SO_3 + 2MX^1 + 2EX^2 + QH_2 \rightarrow QX^1X^2 + 2SO_2 + HX^1 + HX^2 + 2MES_2O_7$ II. $4SO_3 + 2MX^1 + 2EX^2 + QH_2 \rightarrow QX^1X^2 + 2SO_2 + HX^1 + HX^2 + 2MESO_4$ where
M and E = inorganic electropositive elements, and may be the same or different
$X^1$ = a halogen atom
$X^2$ = a halogen atom dissimilar to $X^1$
$QH_2$ = an organic compound
$QX^1X^2$ = an organic compound containing dissimilar halogens
$HX^1$ and $HX^2$ = dissimilar hydrogen halides Specific instances for these general equations, in the case of halogenation of ethane with sodium chloride and sodium bromide, are as follows:

III. $6SO_3 + 2NaCl + 2NaBr + C_2H_6 \rightarrow C_2H_4ClBr + 2SO_2 + HBr + HCl + 2Na_2S_2O_7$ IV. $4SO_3 + 2NaCl + 2NaBr + C_2H_6 \rightarrow C_2H_4ClBr + 2SO_2 + HBr + HCl + 2Na_2SO_4$ When halogenation of a higher order than dihalogenation is desired, as the principal reaction, then correspondingly increasing proportions of inorganic halides should be used. When inorganic halides containing elements other than monovalent elements are used, the stoichiometry of the above equations is slightly modified.

By controlling the input ratios of organic reactants to sulfur trioxide the process can be made to operate to yield as the major inorganic product predominantly either sodium pyrosulfate, as in the first equation above, or sodium sulfate, as in the second equation. In a preferred modification of my invention I operate according to the first equation and produce sodium pyrosulfate. Under many of the reaction conditions which I employ the latter is a liquid compound and can be so handled. It may be pumped, transferred through small diameter lines, etc. Sodium pyrosulfate can be converted to sodium sulfate and sulfur trioxide by further heating. Sulfur trioxide formed in this manner can be recycled to my process and sodium sulfate is a marketable material.

Any combination of two or more inorganic halides can be used according to the terms of my invention. Among the suitable mixtures are mixtures of bromides and chlorides; bromides and iodides; and iodides and chlorides as well as mixtures of bromides, chlorides and iodides. With the above combinations of inorganic reactants the products obtained will contain, respectively, bromine and chlorine; bromine and iodine; iodine and chloride and bromine, chlorine and iodine.

In addition to the inorganic halides illustrated in the equations above, the other inorganic halides generally can be employed in my process. The non-halogen portion of the molecule may be the same for both halogens or different. Illustrative examples are mixtures of sodium chloride-potassium bromide, potassium chloride-sodium bromide, sodium chloride-ferric bromide, ferric chloride-potassium bromide, aluminum chloride-aluminum bromide, ammonium chloride-sodium bromide, sodium chloride-ammonium bromide, ammonium chloride-ammonium bromide, calcium chloride-calcium bromide, calcium chloride-lithium bromide, calcium chloride-magnesium bromide, magnesium chloride-zinc bromide, stannic chloride-potassium bromide for the preparation of derivatives containing chlorine and bromine. For best results the non-halogen portion of the inorganic halide should be selected from the group consisting of elements of groups I, II and III of the periodic table and the ammonium radical. Because of their relative cheapness and availability, I especially prefer to use halides of the alkali and alkaline earth metals, particularly sodium and calcium. In one preferred embodiment of my invention I use mixtures which include two or more compounds of the same halogen. For example, it is advantageous to use mixtures of sodium chloride-potassium chloride-ferric bromide in forming chlorobromo compounds. Use of such mixtures often permits operation in a molten halide bath at temperatures lower than if only one compound of one of the halogens were present. It should be remembered that the ratio of substitution by the dissimilar halogens will be determined largely by the overall atom ratio of dissimilar halogens present in the inorganic mixture.

For the preparation of organic chloroiodo compounds typical halide mixtures are sodium chloride-sodium iodide, potassium chloride-potassium iodide, magnesium chloride-magnesium iodide, calcium chloride-calcium iodide, sodium chloride-magnesium iodide, lithium chloride-aluminum iodide.

When the desired products are bromoiodo compounds the following examples are illustrative: sodium bromide-sodium iodide, potassium bromide-sodium iodide, lithium bromide-sodium iodide, calcium bromide-calcium iodide, sodium bromide-calcium iodide, aluminum bromide-ferric iodide, stannic bromide-stannic iodide, ferric bromide-ferric iodide.

The following mixtures are illustrative of those which can be employed to produce materials containing three dissimilar halogens in the molecule: sodium chloride-sodium bromide-sodium iodide, potassium chloride-potassium bromide-potassium iodide, calcium chloride-calcium bromide-calcium iodide, calcium chloride-sodium bromide-sodium iodide, ferric chloride-ferric bromide-ferric iodide, aluminum chloride-sodium chloride-magnesium iodide.

In addition to the organic compounds illustrated above other organic compounds generally are applicable. Examples are propane, butane, isobutane, higher alkanes, halogenated hydrocarbons, acids, anhydrides, esters, aldehydes, ketones, acetals, ethers, nitro compounds and the like. Best results are obtained when the organic reactant is an alkane, particularly an alkane of not more than four carbon atoms. Of these alkanes, methane and ethane are preferred.

My invention can be carried out at temperatures varying over a wide range. For example, temperatures of 120° C. are operable although in most cases reaction rate is so slow at such temperatures as to make the operation unfeasible for commercial practice. Generally, temperatures of about 250° C. are preferable for a satisfactory reaction rate. The upper limit is determined only by pyrolysis of organic material. In many cases pyrolysis does not become prohibitively fast at temperatures of even as high as about 800° C. and therefore my invention can be used up to at least those temperatures. With most organic compounds, however, pyrolysis becomes important in the neighborhood of 450° C. so that I prefer not to operate above that temperature.

My invention is operable over a wide pressure range, varying from well below atmospheric up to several atmospheres. For convenience and ease of operation, I ordinarily prefer to operate near atmospheric pressure.

The reaction or contact time of my process can vary within wide limits. With some of my reactants reaction is practically instantaneous and contact times of only a few seconds are required. With certain of my reactants, however, particularly compounds of high molecular weight and particularly where operating in the lower temperature range, somewhat longer contact times on the order of several minutes are preferred. In many instances it is desirable to recycle organic material so that only a small conversion per pass is realized but this has the beneficial effect of cutting down the amount of pyrolysis of organic material. In this case the overall contact time can amount to many minutes.

As stated earlier, the halogenated compounds obtained are usually a mixture of all the possible products with considerable control being possible in order to produce predominantly a desired product or products. Another means of controlling the relative amounts of products produced is by controlling the ratio of sulfur trioxide to organic reactant fed to the reaction zone. Generally speaking, the higher the ratio of sulfur trioxide to organic reactant the higher will be the degree of halogenation of the organic compound. Generally speaking, for production of dihalo derivatives the ratio should be approximately 4–6 parts of sulfur trioxide to 1 part of organic material by volume depending on whether it is desired to produce $Na_2SO_4$ or $Na_2S_2O_7$ as the major inorganic product. Similarly, for tri-halogenation the volume ratio of sulfur trioxide to organic reactant should be approximately 6–9 to 1. For higher halogenated derivatives there will be a corresponding increase in the ratio of sulfur trioxide to organic reactant.

The following examples will illustrate several variations in the employment of my invention.

*Example 1*

The reactor comprises a vertical tube surrounded by external heating means and having a plurality of gas inlet tubes generally in the lower portion of the reactor. These inlet tubes are connected outside the reactor with means for purifying, pre-heating, metering, and pre-mixing the gaseous reactants. The outlet tube is connected to a series of condensers for condensing the liquid products. The lower portion of the reactor is filled with an inert packing material upon which rests the mixture of inorganic halogen compounds. In a preferred embodiment of my invention the point of gas introduction lies within the inert packing zone and below the inorganic halide bed. The gaseous reactants pass through the inert packing, thence through the inorganic reactant bed and out the exit tube to the condensers. Temperature measuring devices are spotted at various points throughout the inorganic halogen bed.

To such a reactor is fed a mixed gas stream comprising sulfur trioxide and ethane in volume ratio of six volumes of sulfur trioxide to one of ethane. This stream is preheated to a temperature of 350° C. The inorganic halide bed comprises sodium bromide and sodium chloride in the ratio of 1.8 to 1 by weight. The inorganic halide bed is maintained at a temperature of 350° C. The gaseous product stream is swept out through the exit tube and condensed in a condenser at a temperature of approximately −75° C. The non-condensable products, chiefly unreacted ethane, continue through the exit line past the condenser and can be recycled. The average residence time of gaseous material in the reactor is about 10 seconds. The condensable organic products are chiefly 1-chloro-2-bromoethane and 1-chloro-1-bromoethane. Also present are ethyl chloride, ethyl bromide, dichloroethanes, dibromoethanes and traces of tri- and higher halogenated products. The inorganic salt mixture is converted chiefly to sodium pyrosulfate. Other products present in the gas exit stream are sulfur dioxide, hydrogen chloride, hydrogen bromide and unreacted ethane. Only traces of unreacted sulfur trioxide are found and no elemental halogen is observed.

Propane, butane and isobutane, when employed in this procedure, give substantially identical results. The principal halogenated organic products obtained with these materials are chlorobromopropane, chlorobromobutane and chlorobromoisobutane, respectively. Other organic compounds, such as higher hydrocarbons, halogenated hydrocarbons, acids, anhydrides, esters, ketones, acetals, and the like, give similar results when employed.

Example II

The above experiment is repeated at a temperature of 180° C. with flow rates adjusted to provide an average residence time in the reactor of approximately 4 minutes. Substantially identical results are obtained except that there is a high proportion of tri- and higher halogenated products in the product mixture.

Example III

Example I is repeated at a temperature of 450° C. Substantially identical results are obtained.

When the procedure illustrated in the above three examples is repeated using mixture of potassium chloride-sodium bromide, sodium chloride-ferric bromide, aluminum chloride-aluminum bromide, ammonium chloride-potassium bromide, and similar mixtures, like results are obtained.

Example IV

The procedure of Example I is repeated except that the inorganic halogen mixture comprises sodium bromide and sodium iodide in the ratio of 0.7 to 1 by weight. The major halogenated organic products are 1-bromo-2-iodoethane and 1-bromo-1-iodoethane. Also found are ethyl bromide, ethyl iodide, dibromoethanes, diiodoethanes and traces of tri- and higher halogenated mixtures.

Mixtures of potassium bromide-sodium iodide, calcium bromide-calcium iodide, ammonium bromide-magnesium iodide, sodium bromide-calcium iodide, aluminum bromide-ferric iodide and similar mixtures can be used in this procedure with similar results.

Example V

Ethane is treated with sulfur trioxide and a mixture of ferric chloride and zinc iodide in the ratio of 0.5 to 1 according to the procedure of Example I. The principal organic products are chloroiodoethanes.

Example VI

Ethane is treated with sulfur trioxide and a mixture of sodium chloride and sodium bromide in the ratio of 1.1 to 1 at a temperature of 400° C. The ratio of sulfur trioxide to ethane fed to the reaction zone is 9 to 1 by volume. The principal halogenated organic products are dichlorobromoethanes.

Example VII

Methane is processed according to the procedure of Example I except that the temperature of reaction is 600–700° C. Contact time is approximately 10 seconds. The principal halogenated organic product is chlorobromoethane.

Example VIII

Example VII is repeated except that the contact time is increased to about 2 minutes. The principal organic product is dichlorodibromomethane.

Example IX

Example VII is repeated except that the ratio of sodium bromide to sodium chloride is 0.9 to 1. The predominant organic product is dichlorobromomethane.

Example X

Example VII is repeated except that the ratio of sodium bromide to sodium chloride is 3.5 to 1. The predominant organic product obtained is chlorodibromomethane.

Example XI

Ethane is treated at 250° C. with sulfur trioxide and a mixture of sodium chloride, sodium bromide and magnesium iodide. Organic products containing all three halogens are obtained.

Example XII

Acetic acid is treated with sulfur trioxide and a mixture of sodium chloride and sodium bromide according to the techniques illustrated above. The principal organic product is chlorobromo acetic acid.

Similar results are obtained with propionic acid, butyric acid, adipic acid, ethane sulfonic acid and the like when treated in this manner. Other mixtures of inorganic halogens such as mixtures of chlorides and iodides, bromides and iodides and the like are used with equally satisfactory results.

Example XIII

Acetone is processed according to the procedure of Example XII. The principal halogenated organic product obtained is chlorobromo acetone.

This procedure can be applied equally well to other compounds such as acetophenone, diethyl ketone, propiophenone, methyl isobutyl ketone, and the like.

As stated above, other organic compounds can be processed in addition to those used for purpose of illustration. For example, ethyl chloride can be converted by use of the various procedures illustrated to yield dichlorobromoethanes, dichloroiodoethanes, dichlorofluoroethanes, fluorobromochloroethanes, and the like. Acetic acid may be converted to chlorobromoacetic acid, difluoroiodoacetic acid, dichlorofluoroacetic acid. Other organic products may be treated to yield the desired products. Thus, n-hexanoic acid, acetic anhydride, butyric anhydride, ethyl acetate, methyl butyrate, methylethylketone, valeraldehyde, di-n-butyl ether, ethyl ether, nitropropane, acetal, methylal, etc. may all be treated with any of the inorganic halide mixtures mentioned herein to yield the corresponding halogenated products.

There are other physical means of carrying out my invention in addition to those disclosed herein. For instance, the reaction can be carried out in molten sodium pyrosulfate medium, or continuously, using a fluidized bed technique of contacting solids with gases, or in a mixture of inorganic halides in the molten state.

I claim:

1. A process of producing halogenated alkanes containing dissimilar halogens and metal sulfates, comprising treating in a reaction zone a mixture of dissimilar solid metal halides containing dissimilar halogen atoms selected from the class consisting of alkali metal chlorides, alkali metal bromides, alkaline earth metal chlorides, and alkaline earth metal bromides with a saturated hydrocarbon at a temperature of from 250 to 450° C. in the presence of sulfur trioxide, the sulfur trioxide being in proportion of from about 4 moles to about 9 moles to each mole of said alkane; separately withdrawing a gaseous product stream and a non-gaseous product stream from the reaction zone, the gaseous product stream comprising halogenated alkane containing dissimilar halogens, sulfur trioxide, and hydrogen halide, and the non-gaseous stream comprising metal sulfate; and recovering halogenated hydrocarbon containing dissimilar halogen atoms from the gaseous product stream.

2. Process of claim 1 in which the saturated hydrocarbon is ethane.

3. Process of claim 1 in which the mixture of dissimilar solid metal halides is a mixture of sodium bromide and sodium chloride.

4. A process of producing halogenated ethane containing dissimilar halogens and sodium sulfates, comprising treating in a reaction zone a mixture of sodium bromide and sodium chloride with ethane, at a temperature of from 250 to 450° C., in the presence of sulfur trioxide, the sulfur trioxide being in the proportion of from 4 moles to 9 moles to 1 mole of the ethane, withdrawing a gaseous product stream and an inorganic salt mixture from the reaction zone, and recovering halogenated ethane containing dissimilar halogens from the gaseous product stream.

References Cited in the file of this patent

UNITED STATES PATENTS

| Number | Name | Date |
| --- | --- | --- |
| 1,045,139 | Graul | Nov. 26, 1912 |
| 1,235,283 | Brooks et al. | July 31, 1917 |
| 1,242,208 | Lacy | Oct. 9, 1917 |
| 2,086,473 | Nafash | July 6, 1937 |
| 2,259,248 | Iler | Oct. 14, 1941 |
| 2,302,228 | Kharasch et al. | Nov. 17, 1942 |
| 2,431,880 | Merz | Dec. 2, 1947 |
| 2,553,767 | Hixson et al. | May 22, 1951 |